United States Patent
Georges et al.

(10) Patent No.: US 9,053,376 B2
(45) Date of Patent: Jun. 9, 2015

(54) ELECTRONIC PAYMENT DEVICE

(75) Inventors: Didier Georges, Chabeuil (FR); Sylvain Barneron, Bourg-les-Valence (FR)

(73) Assignee: COMPAGNIE INDUSTRIELLE ET FINANCIERE D'INGENIERIE "INGENICO", Paris (FR)

( * ) Notice: Subject to any disclaimer, the term of this patent is extended or adjusted under 35 U.S.C. 154(b) by 48 days.

(21) Appl. No.: 13/992,363

(22) PCT Filed: Dec. 7, 2011

(86) PCT No.: PCT/EP2011/072001
§ 371 (c)(1),
(2), (4) Date: Aug. 26, 2013

(87) PCT Pub. No.: WO2012/076568
PCT Pub. Date: Jun. 14, 2012

(65) Prior Publication Data
US 2013/0327832 A1    Dec. 12, 2013

(30) Foreign Application Priority Data

Dec. 7, 2010 (FR) .................................. 10 60204
Dec. 7, 2010 (FR) .................................. 10 60205

(51) Int. Cl.
*G06K 7/08* (2006.01)
*G06F 17/00* (2006.01)
(Continued)

(52) U.S. Cl.
CPC .............. *G06K 7/082* (2013.01); *H04M 1/0254* (2013.01); *G06Q 20/347* (2013.01); *G07F 7/0886* (2013.01); *H04M 1/72575* (2013.01); *H04M 2250/14* (2013.01)

(58) Field of Classification Search
CPC ..... G06Q 20/32; G06Q 20/325; G06Q 20/34; G07F 7/0886; G07F 7/0873; G06K 19/06187; G06K 7/082; G06K 19/06196; H04M 2250/14; H04M 1/0202; H04M 1/21; H04M 2215/32
See application file for complete search history.

(56) References Cited

U.S. PATENT DOCUMENTS 5,729,591 A *  3/1998  Bailey ........................... 455/558
7,059,520 B1 *  6/2006  Shtesl .......................... 235/449
(Continued)

FOREIGN PATENT DOCUMENTS

EP        0599244 A2    6/1994
WO   2010024923 A1    3/2010

OTHER PUBLICATIONS

French Search Report dated Jul. 5, 2011 for corresponding French Application No. FR 1060205, filed Dec. 7, 2010.
(Continued)

*Primary Examiner* — Thien M Le
*Assistant Examiner* — Claude J Brown
(74) *Attorney, Agent, or Firm* — David D. Brush; Westman, Champlin & Koehler, P.A.

(57) ABSTRACT

A payment device is provided, which is to be paired with a communication device in order to form an electronic payment terminal. The payment device includes an upper half-shell and a lower half-shell, which includes a surface for attaching a modular interface for pairing the communication device and which includes a longitudinally extending slot. The lower half-shell further includes, within the slot, an opening which enables a magnetic reading head to pass therethrough. Beneath the attachment surface, an electronic circuit card is arranged laterally relative to the magnetic reading head such that the electronic circuit card prevents the insertion of a fraudulent device into the payment device.

7 Claims, 5 Drawing Sheets

Figure 1A:
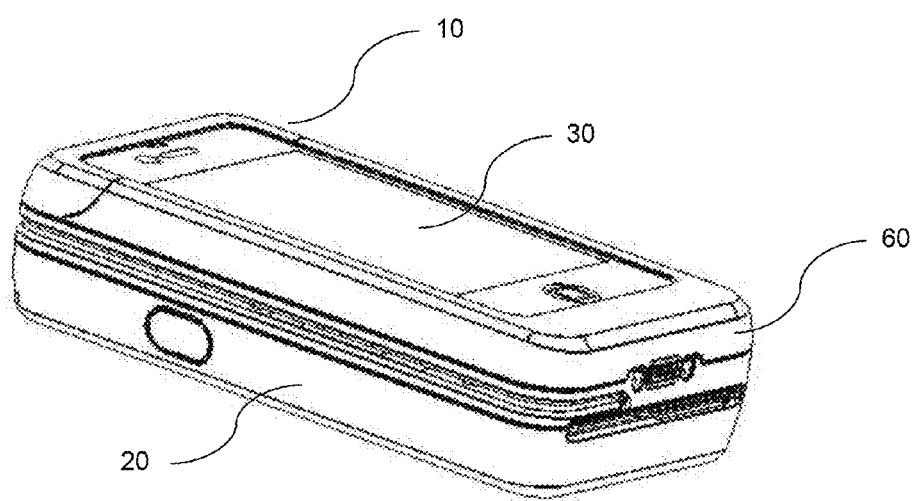

(51) Int. Cl.
*G06K 5/00* (2006.01)
*H04M 1/02* (2006.01)
*G06Q 20/34* (2012.01)
*G07F 7/08* (2006.01)
*H04M 1/725* (2006.01)

(56) References Cited

U.S. PATENT DOCUMENTS

| | | | |
|---|---|---|---|
| 7,360,688 B1* | 4/2008 | Harris | 235/380 |
| 7,783,326 B2* | 8/2010 | Abuhamdeh | 455/558 |
| 2004/0044901 A1* | 3/2004 | Serkowski et al. | 713/200 |
| 2004/0058705 A1* | 3/2004 | Morgan et al. | 455/556.1 |
| 2004/0104268 A1 | 6/2004 | Bailey | |
| 2005/0236480 A1 | 10/2005 | Vrotsos et al. | |
| 2006/0049255 A1 | 3/2006 | von Mueller et al. | |
| 2007/0161418 A1* | 7/2007 | Chen et al. | 455/575.4 |
| 2009/0173790 A1 | 7/2009 | Hart et al. | |
| 2009/0184850 A1* | 7/2009 | Schulz et al. | 341/22 |
| 2010/0155470 A1* | 6/2010 | Woronec | 235/380 |
| 2010/0260388 A1* | 10/2010 | Garrett et al. | 382/124 |
| 2011/0071949 A1* | 3/2011 | Petrov et al. | 705/72 |
| 2012/0160907 A1* | 6/2012 | Hsu et al. | 235/375 |
| 2013/0173475 A1* | 7/2013 | Lund | 705/67 |

OTHER PUBLICATIONS

French Search Report dated Jun. 22, 2011 for corresponding French Application No. FR 1060204, filed Dec. 7, 2010.

International Search Report dated Feb. 3, 2012 for corresponding nternational Application No. PCT/EP2011/072001, filed Dec. 7, 2011.

English Translation Written Opinion dated Feb. 3, 2012 for corresponding International Application No. PCT/EP2011/072001, filed Dec. 7, 2011.

* cited by examiner

ELECTRONIC PAYMENT DEVICE

CROSS-REFERENCE TO RELATED APPLICATIONS

This Application is a Section 371 National Stage Application of International Application No. PCT/EP2011/072001, filed Dec. 7, 2011, which is incorporated by reference in its entirety and published as WO 2012/076568 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The present invention pertains to the field of electronic payment terminals. More particularly, the present invention pertains to a novel type of electronic payment device which can be paired. The invention also pertains more particularly to the protection of a magnetic reading head of such an electronic payment device.

PRIOR ART

At present, payment terminals are used mostly to enable payment for purchases of goods and services at sales points. These terminals generally include a smartcard reader and a magnetic card reader. They also have a screen used in particular to view the amounts involved in the transactions and a keypad for entering these amounts as well as confidential codes, entered by the customers, or else they have a touch-sensitive screen.

The most recent terminals are connected to cash registers and/or to computers by means of communications networks. Such connections can be cable connections, for example of the Ethernet type, or wireless connections. These connections are used for example to link up to an authentication server or to a bank server in order to obtain an authorization of debit.

In order to be able to communicate with the exterior and especially with bank servers, the terminal payments therefore use connection means. One of these means consists of the use of a wireless communications network, for example GPRS (General Packet Radio Service) network. The payment terminal is then provided with a SIM (Subscriber Identity Module) card. This is a chip containing a microcontroller and memory. This SIM card is associated with a telephone subscription (of the data transmission type) which must be paid by the merchant. Apart from the fact that this type of subscription is relatively costly, the performance of communications functions is assigned to the payment terminal. Thus, in addition to the payment functions, the terminal must manage communications functions which are not naturally the functions expected of a payment terminal.

To mitigate the problem of subscription costs associated with the GPRS communication in particular, novel types of payments terminals communicate by means of a WiFi (Wireless Fidelity) type of network for example. The merchant then is no longer obliged to take out a particular subscription. The payment terminal can link up to the merchant's WiFi network and access the bank servers in the same way as in the wire connection. However, the use of the payment terminal is then limited to the coverage zone of the WiFi network, which is not suited to nomadic use (for example for a doctor visiting his patients).

There is therefore a need to propose a payment terminal that can be used by nomadic merchants, hence through the use of a GPRS/UMTS type wireless communications network and, at the same time, to reduce to the minimum the costs of using such a payment terminal.

SUMMARY OF THE INVENTION

The invention does not have these drawbacks of the prior art. The invention pertains more particularly to a payment device intended to be paired with a communications device to form an electronic payment terminal.

According to the invention, said payment device comprises an upper half-shell and a lower half-shell comprising a surface enabling the attachment of a modular interface for the pairing of the communications device and comprising a slot extending longitudinally, said lower half-shell further comprising, within said slot, an aperture enabling the passage of a magnetic reading head, said payment device being furthermore characterized in that it comprises, beneath the attachment surface, an electronic circuit board positioned laterally to said magnetic reading head so that said electronic circuit board makes it possible to fill an unused volume within said payment device.

Thus, the invention prevents the introduction of a fraudulent device into said payment device. Such a fraudulent device could for example take the form of a complementary reading head.

In other words, the invention pertains to a payment device intended to be paired with a communications device to form an electronic payment terminal comprising means for reading a chip of a smartcard and means for reading a magnetic track of a magnetic card, comprising a magnetic reading head.

According to the invention, such a payment device has a longitudinal slot enabling the insertion of a magnetic card and comprises a motherboard carrying at least one first integrated circuit capable of communicating with a smartcard and at least one protective daughter board bearing at least one security element, said protection daughter board extending in parallel to said motherboard along a portion of said slot, so as to prevent fraudulent access to said motherboard by means of said slot.

According to one particular embodiment, said electronic circuit board furthermore comprises at least one integrated circuit for controlling said electronic circuit board.

Thus, this complementary card can be used to provide supplementary functions to the payment device.

According to one particular characteristic, said at least one control integrated circuit comprises means of communication belonging to the group comprising:

Bluetooth® communication standard type means of communication;

WiFi type means of communication;

contactless means of communication.

Thus, the complementary card can be used to add additional functions of communication to the payment device.

According to one particular characteristic, said at least one control integrated circuit comprises at least on identifier of said electronic circuit board.

Thus, it is possible to identify the electronic circuit board to prevent fraudulent use of this circuit card.

According to one particular characteristic, said at least one identifier of said electronic circuit board is a MAC address of a communications means of an integrated circuit for controlling said electronic circuit board.

Thus, it is not necessary to provide for supplementary means, which are necessarily costlier to implement, in order to define an identifier of the control integrated circuit.

According to one particular embodiment, said electronic circuit board furthermore comprises an anti-intrusion device comprising at least one 3D conductive circuit connected to an input of a security processor of said payment device.

Thus, the invention prevents any malicious individual from carrying out a perforation of the payment device.

According to another aspect, the invention also pertains to a method for verifying an integrity of construction of a payment device intended to be paired with a communications device to form an electronic payment terminal, said communications device being characterized in that it comprises an electronic circuit board comprising at least one control integrated circuit comprising at least one identifier of said electronic circuit board.

According to the invention, such a method of verification comprises the following steps in said payment device:

a step for obtaining an identifier recorded within a memory of said payment device;

a step for comparing said recorded identifier with said at least one identifier of said electronic circuit board;

a step for implementing at least one protective measure for protecting at least one piece of confidential data of said payment device when said step for comparing indicates that the recorded identifier and said at least one identifier of said electronic circuit board are different.

According to another aspect, the invention pertains to an electronic payment terminal (10) formed by the pairing of a payment device (20) and a communications device (30).

According to the invention, said payment device (20) comprises a case formed by an upper half-shell (21-3) and a lower half-shell (21-4) comprising a surface (22) for attaching a modular interface (60) for the pairing of the communications device (30) and a slot (21-42) extending longitudinally, said slot having an aperture (23-1) enabling the passage of a magnetic reading head (24), said payment device (20) furthermore comprising, beneath the attachment surface (22), an electronic circuit board (26) positioned laterally to said magnetic reading head (24) so that said electronic circuit board (26) makes it possible to fill an unused volume (25) within said payment device, said communications device (30) being a standard telephone terminal.

LIST OF FIGURES

Figure 2:
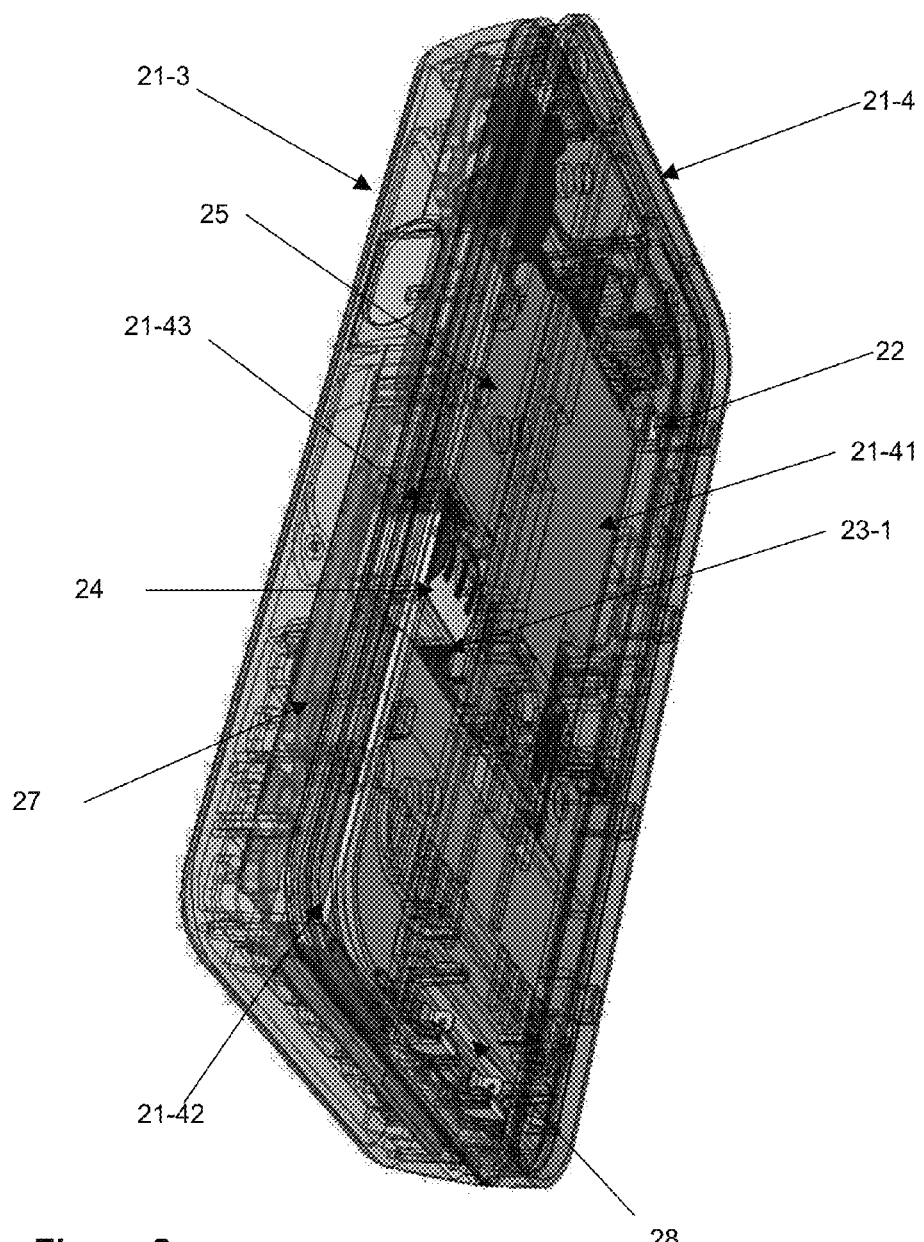
Figure 3:
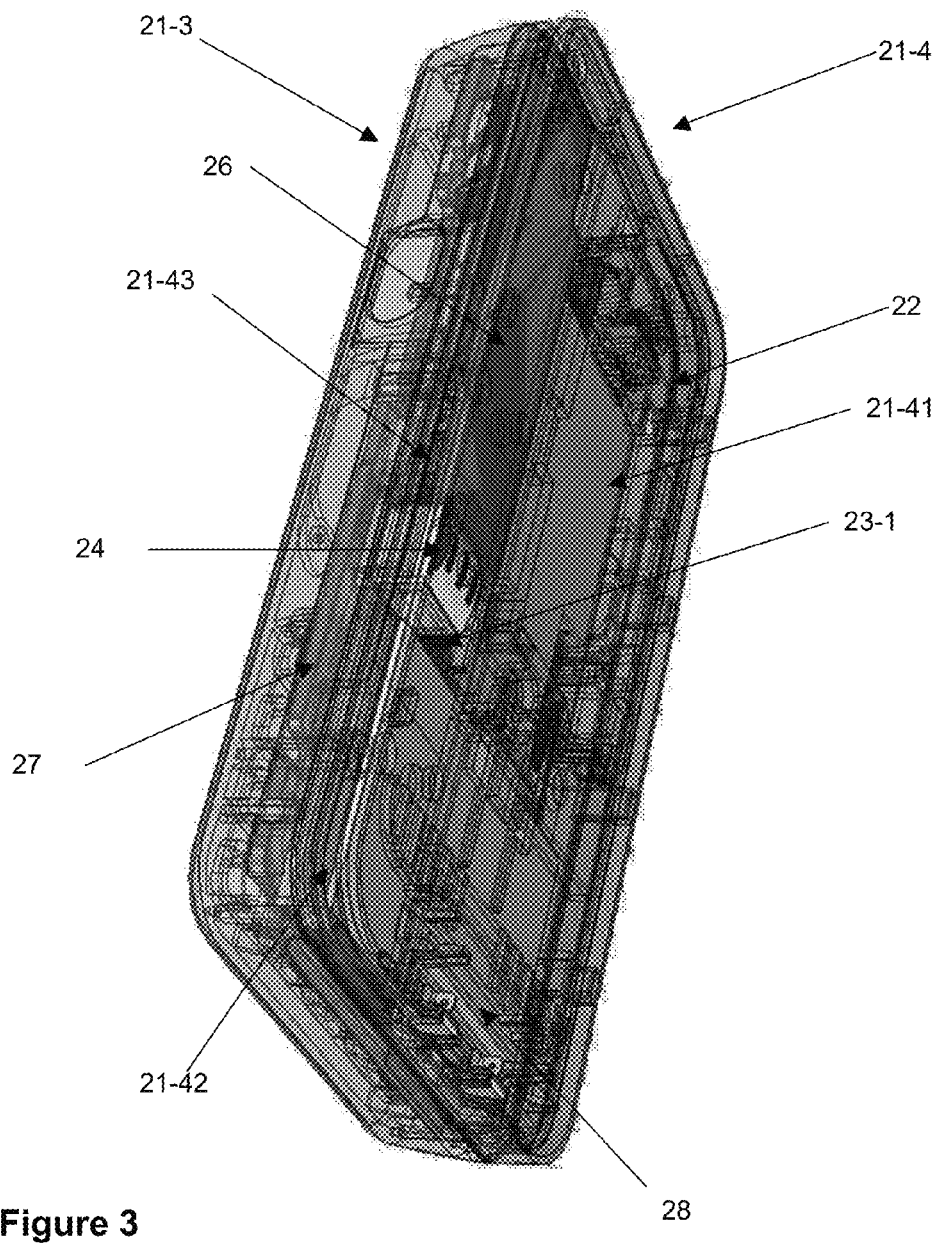

Other features and advantages of the invention shall appear more clearly from the following description of a particular embodiment given by way of a simple illustratory and non-exhaustive example and from the appended figures, of which:

FIGS. 1A to 1D illustrate an example of a payment terminal according to one embodiment of the invention;

FIG. 2 presents the internal structure of the payment device;

FIG. 3 presents the internal structure of the payment device with the addition of the daughter board.

DESCRIPTION OF ONE EMBODIMENT OF THE INVENTION

The general principle of the invention relies on the physical pairing of a payment device with a communications device, such as a "smartphone" to form a payment terminal.

Thus, the invention makes it possible to overcome the drawbacks of the prior art and especially makes it possible to avoid having recourse to a dedicated telephone line in order to set up a connection with the communications network and with servers such as authorization servers or bank servers.

More particularly, in one embodiment of the invention, the payment device can be physically paired with the communications device by means of a particular pairing structure, called a modular interface. When it is used, this modular interface is fixed to a rear face of the payment device. This structure can be dismantled according to one particular embodiment of the invention by applying a particular mode of kinematic functioning.

This modular interface according to the invention enables the insertion and retaining of the communications device in a housing planned for this purpose. Among the elements of this modular interface, according to the invention, it is possible to distinguish particularly a pairing device, also called an electronic connection board, by which a physical connection can be set up between the payment device and the communications device.

This modular interface comprises other elements which, according to certain embodiments of the invention, enable secure use of the payment terminal formed by the payment device and the communications device.

More particularly, the payment terminal that is an object of the invention is described with reference to FIGS. 1A to 1D, 2 and 3.

The payment terminal (10) comprises two general subassemblies, which can be assembled, constituted by the payment device (20) and the communications device (30).

Figure 1B:
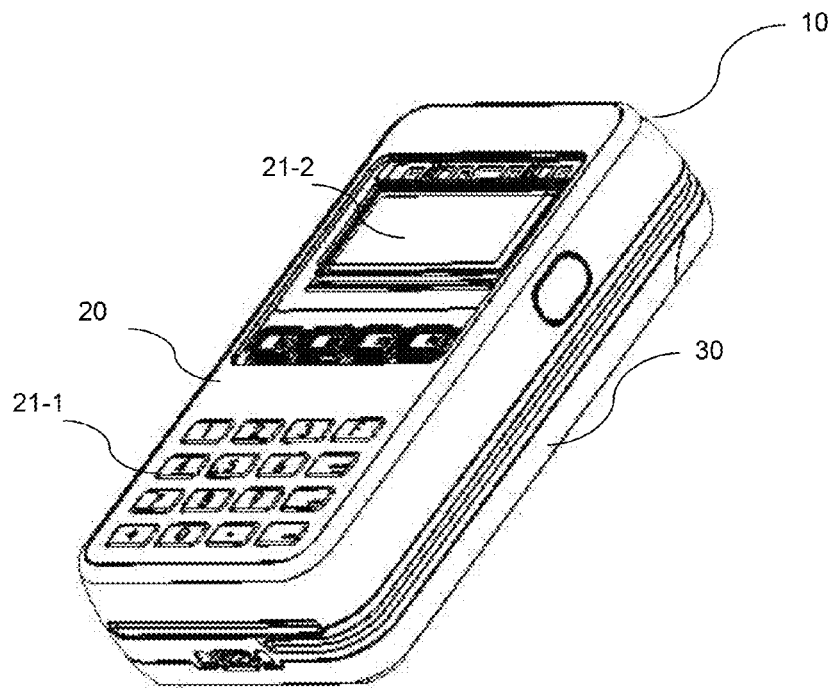
Figure 1C:
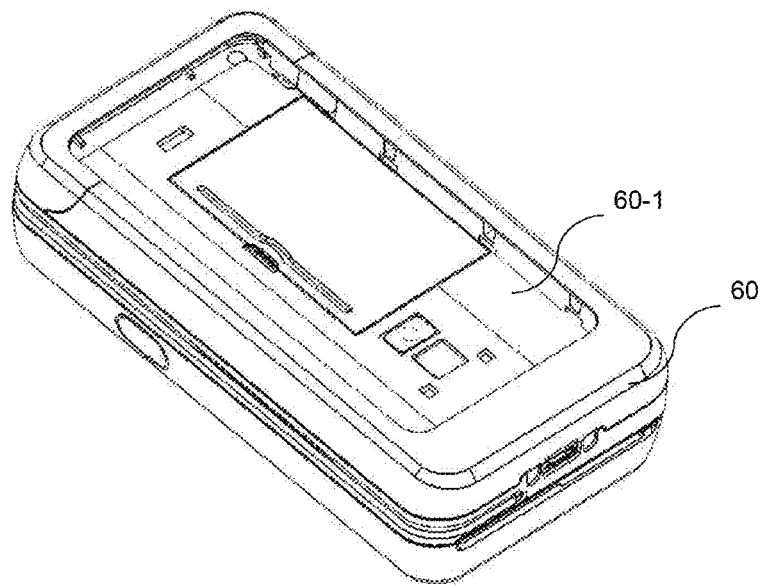
Figure 1D:
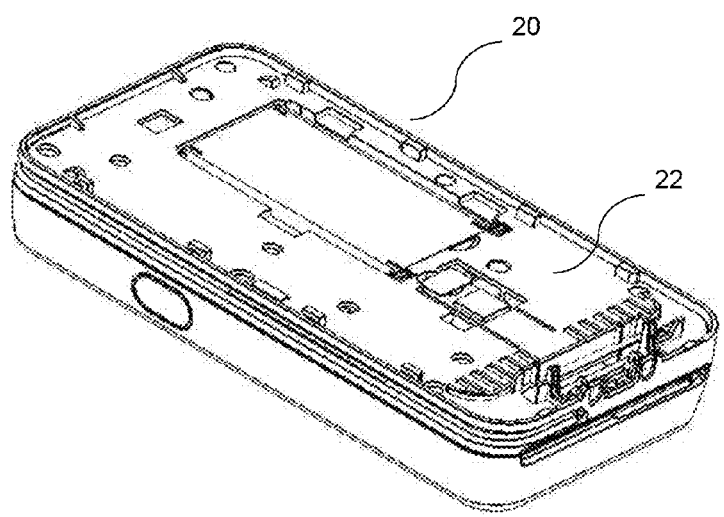

As illustrated, and in an illustratory and non-exhaustive embodiment of the invention, the payment device (20) comprises a front face, which can be seen in FIG. 1B, having a keypad for keying in information (21-1), a screen for viewing (21-2) the information keyed in. The payment device comprises, on the rear face which can be seen in FIG. 1D, an attachment surface (22) enabling the attachment of a modular interface (60) for the pairing of the communications terminal (30).

More particularly, this modular interface defines a housing (60-1) for inserting and pairing the communications device (30).

The payment device, for its part, is formed to fulfill the payment functions. To this end, the payment device (20) comprises, in addition to the keypad for keying in information (21-1) and the screen (21-2) for viewing keyed-in information, an upper half-shell (21-3) comprising the holes needed for the passage of the keys of the keypad (21-1) and an aperture for the viewing of the screen (21-2). The screen can also be touch-sensitive and fulfill the keypad function.

The payment device (20) also includes a lower half-shell (21-4) which is fixedly attached to the upper half-shell (21-3) to form the case of the payment device (20). The lower half-shell (21-4) defines the surface (22) enabling the attachment of the modular interface (60). The lower half-shell (21-4) comprises a housing (21-41) to insert a battery enabling the electrical power supply to the payment device (20).

The lower half-shell (21-4) is also formed so that it has a slot (21-42) enabling the passage of a payment card comprising a magnetic track. Once the payment device has been assembled, this slot (21-42) extends on one of the flanks of the payment device (20) and enables the reading of the magnetic stripe payment card by a motion of translation of this magnetic stripe card on the length of the payment device (20).

The lower half-shell (21-4) of the payment device (20) comprises an aperture (21-43) crossed by a magnetic reading head (24). This aperture (21-43) is formed so that it can enable a certain mobility on the part of the magnetic reading head (24). Thus a limited clearance, providing this mobility, is possible. It is made on the rim of the aperture. The magnetic head (24) can thus move to a certain extent in order to provide optimum reading of the pieces of information contained on the magnetic track of a payment card. This magnetic reading head (24) is placed on a support and connected to a motherboard (27) of the payment device by means of a ribbon cable connector.

The motherboard (27) is an electronic circuit comprising, on a first face in this embodiment, a set of microcircuits, for example one or more microprocessors and/or memories, as well as devices enabling the connection of the keypad elements (21-1) and the viewing screen (21-2). On its second face, the motherboard comprises other microcircuits as well as a memory card reader (also called an MC reader) (28). This reader (28) is configured to enable the insertion and the reading of a payment card comprising a chip.

An unused volume (25) is present beneath the attachment surface (22) of the lower half-shell (21-4) laterally to the magnetic reading head (24).

In order to increase the security of the payment devices, the inventors have had the idea of proposing the addition of a card, also called a "daughter" board, making it possible, on the one hand, to secure access to the internal components of the payment device and, on the other hand, to fulfill other ancillary functions of the payment card which are described in detail here below. This daughter board is situated beneath the attachment surface (22) enabling the attachment of a modular interface (60) to pair the communications device (30). In other words, it is this daughter board that prevents access to the motherboard and prevents the insertion of a magnetic head.

According to the invention, a security board (PCB) called a "daughter" board (26, FIG. 3) is provided, in proximity to the slot and in the neighborhood of the magnetic head, above a portion of the motherboard. This daughter board thus occupies the free volume appearing at the level of the slot, thus preventing electronic access through this slot to the motherboard and/or a fraudulent introduction of a second magnetic reading head. This daughter board (25) (26) is therefore formed to occupy the available volume (25) in the payment device (20) and secondly to protect access to the motherboard (27).

Thus, the security of the payment device is optimized in a simple and efficient manner in taking account of the constraints laid down by its shape, which must be adapted to the communications device with which it has to cooperate.

According to one complementary characteristic, the daughter board furthermore comprises one or more of the communications means between the payment communications device and the exterior. These envisaged communication means include:
- a BT (Bluetooth® communication standard) communications interface;
- a WiFi communications interface;
- an RFID type contactless communications interface.

According to a complementary characteristic, the daughter board furthermore comprises a device for identifying the payment device to which said daughter board is supposed to be connected. Thus, the invention makes it possible to be sure that the payment device cannot be disassembled in order to rebuild another payment device out of detached parts belonging to various other payment devices. Indeed, an individual without the necessary authorization to assemble and disassemble the payment devices will not be able to assemble a new device using detached parts recovered from other payment devices because the identification device present on the daughter board will enable the attempt to be detected. The payment device will therefore passes into attack mode.

As already mentioned, in this mode of functioning, the terminal takes the necessary steps to protect the content of the data, especially the bank data which is contained in the memories of the terminal.

According to one particular embodiment, this identifier comprises a MAC address corresponding to the MAC address of one of the communications interfaces integrated into the daughter board. This MAC address, which enables a unique identification of the communications circuit used, is provided to the payment device so that it can identify the motherboard associated with it.

According to another complementary characteristic, the daughter board is also provided with an anti-intrusion device itself connected to the input of the security processor of the payment device. The anti-intrusion device comprises at least one 3D conductive circuit, for example in the form of a lattice, and/or a contact element of this conductive circuit with an array for connecting the anti-intrusion device to the printed circuit of the motherboard of the payment device.

Although the present disclosure has been described with reference to one or more examples, workers skilled in the art will recognize that changes may be made in form and detail without departing from the scope of the disclosure and/or the appended claims.

The invention claimed is:

1. A payment device configured to be paired with a communications device to form an electronic payment terminal, wherein said payment device comprises:
    a case formed by an upper half-shell and a lower half-shell comprising a surface for attaching a modular interface for the pairing of the communications device and a slot extending longitudinally, said slot having an aperture enabling passage of a magnetic reading head, and
    beneath the attachment surface, an electronic circuit board positioned laterally to said magnetic reading head and substantially in the same plane as a reading surface of said magnetic head, so that said electronic circuit board makes it possible to fill appreciably the totality of an unused volume within said payment device, wherein the unused volume appears at a level of the slot.

2. The payment device according to claim 1, wherein said electronic circuit board furthermore comprises at least one of a control or communications integrated circuit.

3. The payment device (20) according to claim 2, wherein said at least one control integrated circuit comprises a communication circuit selected from the group consisting of:
    a Bluetooth communication standard type communication circuit;
    a WiFi communication circuit;
    a contactless communication circuit.

4. The payment device according to claim 2, wherein said at least one control integrated circuit comprises at least one identifier of said electronic circuit board.

5. The payment device according to claim 4, wherein said electronic circuit board comprises a communications integrated circuit and said at least one identifier of said electronic circuit board is a MAC address of the communications integrated circuit of said electronic circuit board.

6. The payment device according to claim 1, wherein said electronic circuit board furthermore comprises an anti-intrusion device comprising at least one 3D conductive circuit connected to an input of a security processor of said payment device.

7. An electronic payment terminal comprising:
- a communications device comprising a standard telephone terminal; and
- a payment device, which is paired with the communications device and comprises:
- a case formed by an upper half-shell and a lower half-shell comprising a surface for attaching a modular interface for pairing the communications device and a slot extending longitudinally, said slot having an aperture enabling the passage of a magnetic reading head; and
- beneath the attachment surface, an electronic circuit board positioned laterally to said magnetic reading head so that said electronic circuit board makes it possible to fill an unused volume within said payment device, wherein the unused volume appears at a level of the slot.

* * * * *